United States Patent
Lumbatis

(10) Patent No.: US 9,992,766 B2
(45) Date of Patent: Jun. 5, 2018

(54) UTILIZING ACTIVE OR PASSIVE BUFFERED DATA METRICS TO MITIGATE STREAMING DATA INTERRUPTION DURING DYNAMIC CHANNEL CHANGE OPERATIONS

(71) Applicant: ARRIS Enterprises, Inc., Suwanee, GA (US)

(72) Inventor: Kurt Alan Lumbatis, Dacula, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days. days.

(21) Appl. No.: 14/811,796

(22) Filed: Jul. 28, 2015

(65) Prior Publication Data

US 2017/0034807 A1 Feb. 2, 2017

(51) Int. Cl.
*H04W 72/04* (2009.01)
*H04L 29/06* (2006.01)
(Continued)

(52) U.S. Cl.
CPC ......... *H04W 72/04* (2013.01); *H04L 43/0817* (2013.01); *H04L 47/122* (2013.01);
(Continued)

(58) Field of Classification Search
CPC ..... H04W 84/12; H04W 24/02; H04W 28/14; H04W 36/16; H04W 36/24; H04W 40/04; H04W 36/06; H04W 72/0406; H04W 24/10; H04W 36/14; H04W 72/0453; H04W 88/08; H04W 28/02; H04W 28/20; H04W 72/04; H04W 28/0278; H04W 92/10; H04L 43/0876; H04L 43/16; H04L 47/12; H04L 47/14; H04L 49/90;
(Continued)

(56) References Cited

U.S. PATENT DOCUMENTS 8,861,541 B1 * 10/2014 Banerjea ............... H04L 47/122
370/431
2004/0166852 A1 8/2004 Backers et al.
(Continued)

OTHER PUBLICATIONS

PCT Search Report & Written Opinion, RE: Application No. PCT/US2016/042732, dated Oct. 6, 2016.

*Primary Examiner* — Paul H Masur
*Assistant Examiner* — Michael Phillips
(74) *Attorney, Agent, or Firm* — Larry T. Cullen

(57) ABSTRACT

A wireless access point device including a network interface configured to communicate with a content provider server through a network, a wireless transceiver configured to communicate with a client device through an antenna, and a processor. The processor is coupled to and configured to control the network interface and the wireless transceiver, to cause the wireless access point device to receive data from the content provider server, stream the data to the client device over a first channel of a plurality of channels, determine that a buffer of the client device has sufficient buffered data having been received over the first channel so that output of streamed data via the client device can continue during a channel scan, and scan a second channel of the plurality of channels, whereby the output of the streamed data via the client device continues during the scan of the second channel.

13 Claims, 10 Drawing Sheets

(51) Int. Cl.
*H04W 28/20* (2009.01)
*H04L 12/26* (2006.01)
*H04L 12/803* (2013.01)
*H04L 12/835* (2013.01)
*H04W 24/02* (2009.01)

(52) U.S. Cl.
CPC ............ H04L 47/125 (2013.01); H04L 47/30 (2013.01); H04L 65/4069 (2013.01); H04W 28/20 (2013.01); *H04W 24/02* (2013.01)

(58) Field of Classification Search
CPC . H04L 65/4069; H04L 47/122; H04L 47/125; H04L 47/30; H04L 43/0817
See application file for complete search history.

(56) References Cited

U.S. PATENT DOCUMENTS

| | | | |
|---|---|---|---|
| 2007/0011343 A1* | 1/2007 | Davis | H04L 29/06027 709/231 |
| 2009/0222873 A1* | 9/2009 | Einarsson | H04N 21/23406 725/115 |
| 2013/0337806 A1 | 12/2013 | Barash et al. | |
| 2015/0003434 A1 | 1/2015 | Shi et al. | |
| 2015/0319747 A1* | 11/2015 | Chu | H04W 72/0406 370/330 |
| 2016/0164788 A1* | 6/2016 | Goel | H04L 43/0876 709/228 |
| 2016/0295486 A1* | 10/2016 | Langer | H04W 36/30 |
| 2016/0345343 A1* | 11/2016 | Elsherif | H04W 72/121 |

* cited by examiner

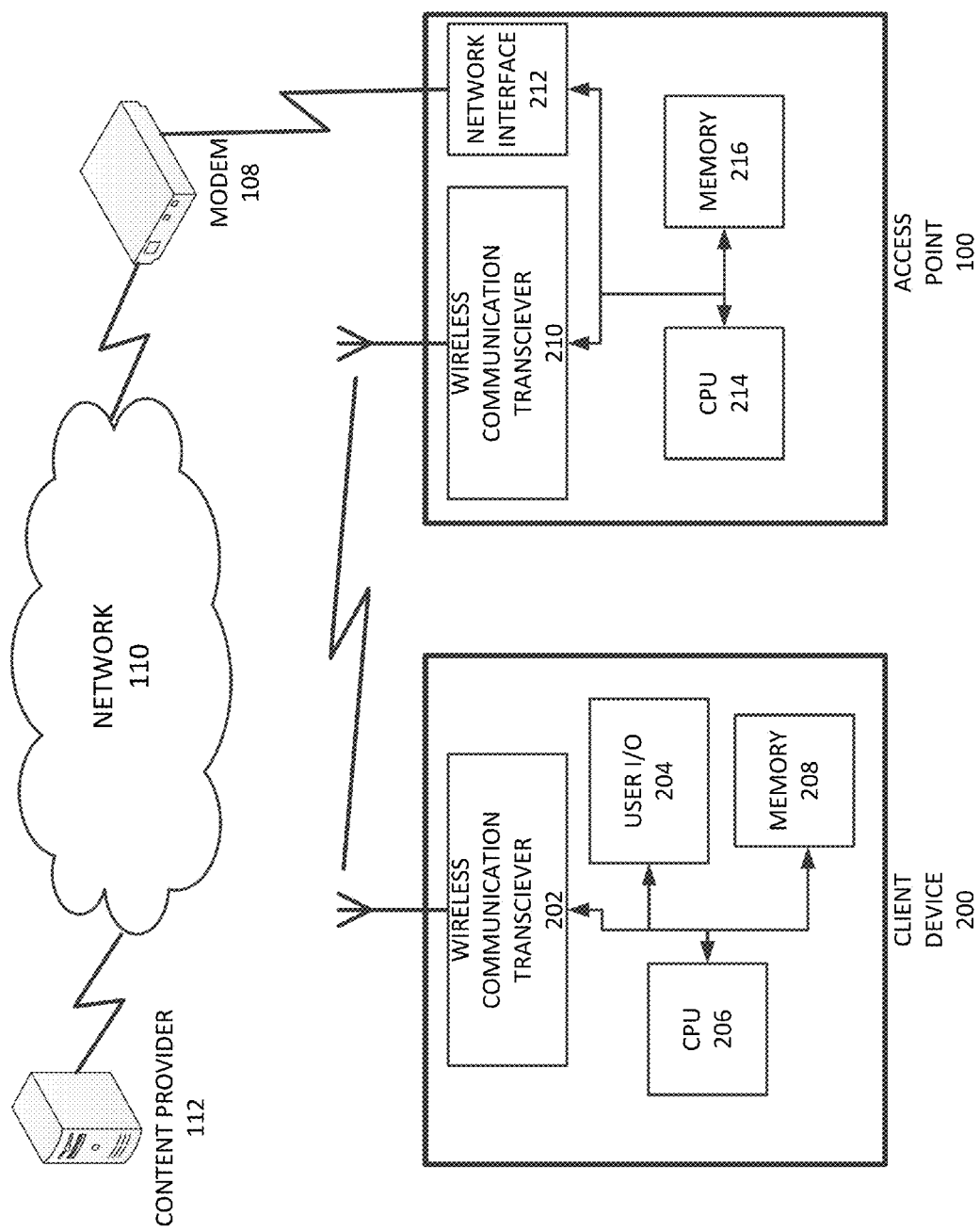

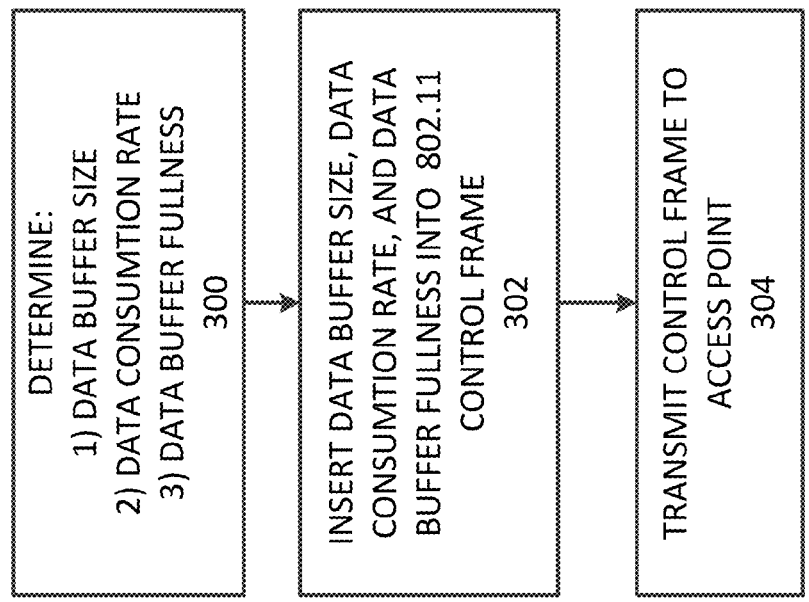

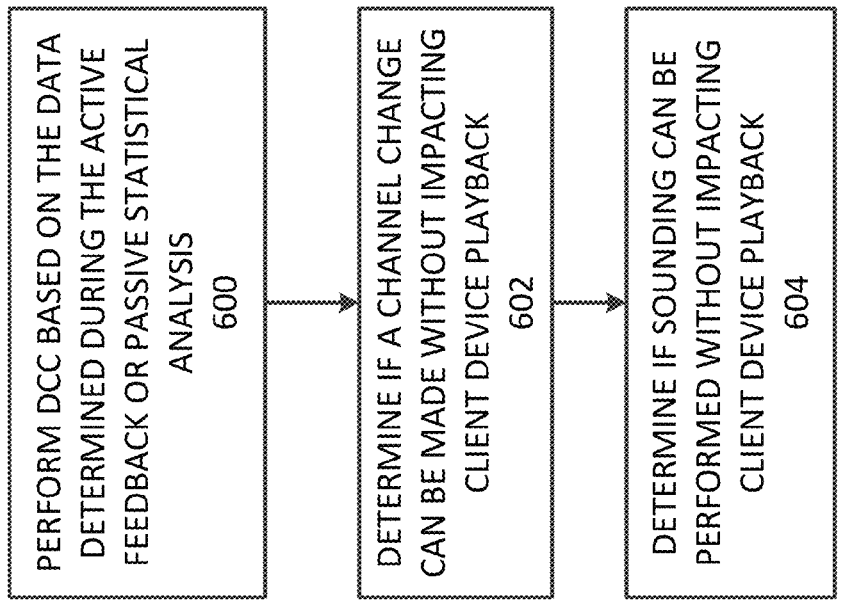

UTILIZING ACTIVE OR PASSIVE BUFFERED DATA METRICS TO MITIGATE STREAMING DATA INTERRUPTION DURING DYNAMIC CHANNEL CHANGE OPERATIONS

This application relates, in general, to a system and a method for mitigating streaming data interruption when scanning and switching communication channels. More specifically, this application relates to using active and/or passive techniques to determine when to scan and switch communication channels so that streaming data interruption is mitigated.

BACKGROUND

Modern data communication networks offer a wide range of services. Recently, an increasing variety of those services have involved real-time communication of data, typically for real-time processing and presentation of information to a user of a client device. Examples of these kinds of 'streaming' communication services include real-time transmission of audio and video information in one or more directions, e.g. for sending radio programs, television programs, movies or the like to the user's client device for presentation, or for telephone or videophone type calls via the data network.

Modern data communication networks transport the data to and from client devices in packets. Packet data transport typically utilizes layered protocols in the Internet Protocol (IP) suite. Data in a large number of individual packet transported through a packet network, however, often is subject to packet delay and/or delay variation (jitter).

With the explosion in the number and types of user devices and the explosion in the variety of service, more and more networks support communication of streaming (and other type of) services over wireless links. Streaming type applications may be adversely impacted by delay or jitter in the delivery of packets to the client device.

Conventional wireless communication protocols such as 802.11 for packet data transport utilize access points (AP) as the wireless access node that communicates over the air with the wireless or mobile device of the user. 802.11 communications typically provide local wireless links (as opposite to longer/wider area links offered by public/cellular/wide are types of networks). The access point in an 802.11 network determines an appropriate channel among a plurality of possible 802.11 channels for communicating with one or more client devices within range of the access point. This channel determination is made through a process known as sounding (i.e. scanning of channels). To perform sounding, the AP stops transmitting data to the client device, and begins scanning the possible 802.11 channels.

However, this scanning process typically takes 20 ms-50 ms per channel. For an arrangement, with a substantial number of possible channels, the scanning operation at times may take a 30 to 60 seconds, e.g. if the access point has to scan almost all the channels to find a suitable new channel for the switching operation. Data packets intended for the client device may be buffered on the network side during the scan, to mitigate any potential for packet loss. A long total scan time results in a long interruption in streaming data transmission from the access point to the client device. The delay between packets caused by the interruption may impact output to the device user if the client device does not have a sufficient amount of buffered previously received data to continue its decoding and presentation operations for the entire time of the transmission interruption. This interruption in streaming data output may be noticeable to a user of the client device executing streaming applications (e.g. if the streaming movie freezes during playback).

SUMMARY

To meet this and other needs, and in view of its purposes, the described system includes a wireless access point device including a network interface configured to communicate with a content provider server through a network, a wireless transceiver configured to communicate with a client device through an antenna, and a processor coupled to and configured to control the network interface and the wireless transceiver, to cause the wireless access point device to receive data from the content provider server through the network interface, stream the data to the client device through the wireless transceiver over a first channel of a plurality of channels, determine that a buffer of the client device has sufficient buffered data having been received over the first channel so that output of streamed data via the client device can continue during a channel scan, and scan a second channel of the plurality of channels, whereby the output of the streamed data via the client device continues during the scan of the second channel.

Also included is a method, including communicating, by a network interface of a wireless access point, with a content provider server through a network, communicating, by a wireless transceiver of the wireless access point, with a client device through an antenna, receiving, by a processor of the wireless access point coupled to both the wireless transceiver and the network interface, data from the content provider server through the network interface, streaming, by the processor, the data to the client device over a first channel of a plurality of channels, determining, by the processor, that a buffer of the client device has sufficient buffered data having been received over the first channel so that output of streamed data via the client device can continue during a channel scan, and scanning, by the processor, the second channel of the plurality of channels, whereby the output of the streamed data via the client device continues during the scan of the second channel.

Also included is a non-transitory computer readable medium including programming stored thereon, that when executed by a processor of a wireless access point, causes the wireless access point to communicate with a content provider server through a network interface, communicate with a client device through an antenna, receive data from the content provider server through the network interface, stream the data to the client device through a wireless transceiver over a first channel of a plurality of channels, determine that a buffer of the client device has sufficient buffered data having been received over the first channel so that output of streamed data via the client device can continue during a channel scan, and scan a second channel of the plurality of channels, whereby the output of the streamed data via the client device continues during the scan of the second channel.

It is understood that the foregoing general description and the following detailed description relate to examples, but are not restrictive.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 2 is a detailed diagram showing hardware components of various devices in the system diagram of FIG. 1.

FIG. 3A is a flowchart illustrating an example of active feedback performed by the client device.

FIG. 6A is a flowchart illustrating distributed content control using information obtained during the active feedback in FIGS. 3A and 3B or using information obtained during the passive statistical analysis in FIGS. 5A and 5B.

DETAILED DESCRIPTION

Figure 1:
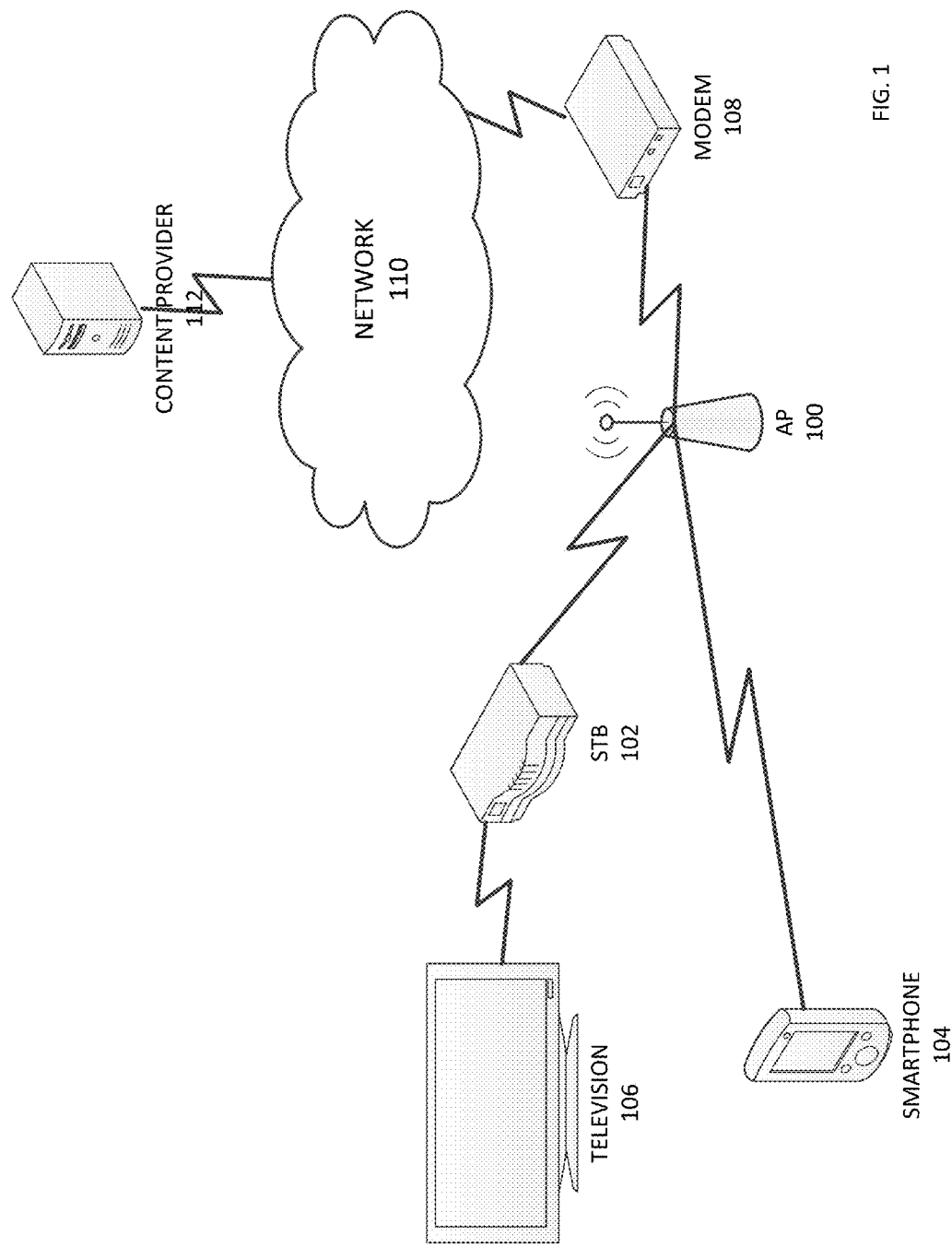
FIG. 1 is a diagram of a an example of a system for mitigating streaming data interruption.

In the following detailed description, numerous specific details are set forth by way of non-limiting examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As described below, the examples mitigate streaming data interruption when scanning and switching communication channels when using wireless communication protocols (e.g. 802.11 protocol) that have a plurality of available channels. More specifically, the wireless access point device in the examples performs active feedback and/or passive statistical analysis in order to control the scanning and switching of communication channels in order to provide an adequate channel to perform streaming while mitigating impact of data interruption during the scan/switch.

In general, 802.11 is a set of medium access control (MAC) and physical layer (PHY) protocols for implementing a wireless local area network (WLAN). A WLAN that utilizes those protocols for IP packet data transport services may perform transmissions in various frequencies bands that include, but are not limited to, 2.4 GHz, 3.4 GHz, 5 GHz and 60 GHz.

802.11b/g/n products operate in the worldwide free 2.4 GHz ISM frequency band (2.412-2.472 GHz). In contrast, 802.11h products operate in the 5 GHz frequency band (5.180-5.825 GHz). The 5 GHz frequency band, however, may be shared with some other users, e.g. some radar systems.

In particular, 802.11h is an 802.11 standardized protocol that is utilized by communication devices to solve problems such as interference with satellites and radar for WLANs using a 5 GHz frequency band. 802.11 protocols, for example 802.11h, include multiple channels within the 5 GHz frequency band. Transmissions of information occur on any one or more of these plurality of channels, for example, upon selection of a channel that is free of interfering usage by satellites or radar systems. Selecting a channel in the 802.11 band is performed by dynamic channel allocation (DCA) using various metrics in order to determine a channel that provides adequate quality of service (QOS) to the receiving client device.

During operation, an access point that is using the 802.11 protocol determines that a particular channel, that a client device is currently receiving data on, has degraded (e.g., there is interference). The 802.11 protocol access point then performs a sounding (i.e., scanning) process where the transmission of data to the client device ceases, while other channels within the 802.11 band are scanned to determine if they are better (e.g. have better quality) than the current channel. If the 802.11 protocol access point finds another channel that is better than the current channel, then the 802.11 protocol access point switches to that new channel and then resumes transmitting the data to the client device. However, it is important to mitigate impact of the interruption in data transmission, especially during data streaming where the user of the client device is watching a video and/nor listening to real-time audio.

FIG. 1 shows a system diagram of a WLAN which includes access point (AP) 100, set top box (STB) 102, Smartphone 104 and television 106. A wireless AP is a device that allows wireless devices to connect to a wired network using Wi-Fi, or related standards. The AP may connect to a wired network router as a standalone device on the edge of the wired network. Alternatively, as used today in many residential installations, the network router can be an integral component together with the hardware forming the wireless access point. Although shown separately, some AP implementations also incorporate the broadband modem.

Although not shown, the set top box (STB) 102, in one example, includes an input terminal (e.g. coaxial, Ethernet, etc.) that is configured to receive various video/audios and other information signals that include but are not limited to cable television signals, satellite television signals, streaming data packets, etc. The STB is configured to convert the received signals (e.g. the cable television signal) into a video/audio format that can then be displayed on television. For streaming data services, the STB 102 may also include a WiFi or other wireless transceiver for communication via the wireless AP 100 and the modem 108.

Although not shown, the Smartphone 104, in one example, is a mobile phone that is configured with numerous capabilities. These capabilities include the capabilities of a cell phone, a personal digital assistant (PDA), a media player and a GPS navigation unit, among others. In this example, Smartphone 104 has a touchscreen user interface, and has the ability to execute third-party applications. Smartphone 104 also has high-speed mobile broadband 4G LTE internet, motion sensors, and mobile payment mechanisms. For streaming data services, the Smartphone 104 may also include a WiFi or other wireless transceiver for communication via the wireless AP 100 and the modem 108.

The television (TV) 106, in one example, is a device that receives audio/video signals in analog or digital format from the STB 104, and outputs visual/audible outputs (e.g. a movie) to the user (i.e. the TV viewer). Television 106 may be any type of TV including but not limited to a cathode ray tube (CRT) TV, plasma TV, liquid crystal display (LCD) TV, light emitting diode (LED) TV, etc.

Also included in the system diagram of FIG. 1 is a computer of a content provider 112 (e.g., a computer running a server program that is providing TV or movie data), network 110 (e.g. Internet) and modem 108. The modem 108 is a device that modulates signals to encode digital information and demodulates signals to decode the transmitted information. For example, modem 108 is configured to convert signals that are transmitted between network 110 and AP 100. Modem 108 may be any type of modem of sufficient bandwidth for a particular streaming or other data service, including but not limited to dial-up, broadband (e.g. cable modem, fiber network modem, digital subscriber line, etc.) that converts signals between the network and AP 100. In some applications, modem 108 may be purchased at an electronics store, or may be provided to the viewer by their cable/internet provider company.

It should be noted that although STB 102, television 106 and Smartphone 104 are shown as part of the WLAN, other devices may also be included as part of the WLAN and would also communicate with AP 100. Examples of other devices that may connect to the WLAN include but are not limited to tablet computers, laptop computers or any wireless device that is configured to receive streaming data from AP 100. It should also be noted that the communication connections shown in FIG. 1 (i.e. lightning bolts) may be wireless, wired, or various combinations of wireless/wired connections. For example, while wireless AP 100 may communicate wirelessly to STB 102 and Smartphone 104 (and possibly other wireless devices not shown), a wired connection (e.g. High Definition Multi-media Interface HDMI) may be found between television 106 and STB 102, and other wired connections (e.g. Ethernet, Universal Serial Bus USB, Fiber-Optic Cable) may be found between AP 100 and modem 108, between modem 108 and network 110, and between network 110 and content provider 112.

During operation, a user operates Smartphone 104 or television 106 to request data from content provider 112 for real-time presentation on the applicable user device. It should be noted that the operations between Smartphone 104 and AP 100 and the operations between STB 102 and AP 100 are fairly similar. Thus, in the description provided below, the use of Smartphone 104 (i.e. not STB 102) will be discussed for simplification purposes.

In one example, the user may wish to stream a movie for viewing on Smartphone 104. When this request is made, Smartphone 104 sends a request over wireless link to AP 100. AP 100 then forwards this request to content provider 112 to modem 108 and via modem 108 to the network 110. The network 110 delivers the content request to the server computer 112 of the content provider. In response to the request, content provider computer 112 (i.e. the server) starts transmitting (i.e., streaming) the requested content (i.e. the movie) back to AP 100 via network 110 and modem 108 and the wired/wireless link between the modem and the AP. AP 100, as shown in FIG. 1, implements 802.11 wireless protocol in order to wirelessly transmit the streamed movie data to Smartphone 104 which also implements 802.11 protocol.

During this initial transmission, AP 100 selects one of the various channels that are available in the applicable 802.11 band (e.g., the 5 GHz band for 802.11h). The movie data is then continuously streamed over (i.e., transmitted via a 802.11 wireless link) to Smartphone 104 via the selected channels. AP 100, at a later time however, determines to switch the wireless communication with the client device to another channel. The AP 100 may determine to switch channels based on a degradation of the channel quality of the current channel, or the AP 100 may determine to switch channels in response to receipt of a request from Smartphone 104 to change the channel due to degradation as sensed at the applicable client device. In response to this AP detection of degradation, or receiving of a change request from the client device, AP 100 attempts to perform sounding in order to scan the other channels that are available in the 802.11 protocol and select a new channel. However, prior to performing sounding, AP 100 determines if Smartphone 104 has enough of the streamed data (i.e. the video) stored in the buffer so that when the sounding process is performed by AP 100, interruption is mitigated during the playback of the video.

In order to determine if there is a sufficient amount of data in the buffer(s) of Smartphone 104 to perform sounding/switching, AP 100 performs an analysis. Two examples of the analysis/estimation methodology, active feedback or passive statistical analysis, are described in more detail below. In general, in the first example, AP 100 utilizes active feedback where Smartphone 104 transmits its buffer status information that includes but is not limited to data buffer size, data consumption rate and data buffer fullness back to AP 100. The AP 100 utilizes the data actively sent by the Smartphone 104 to assess the data in the buffer of the Smartphone and control channel scanning operations of the AP 100. In general, in the second example, AP 100 utilizes a passive statistical analysis based on monitoring of or "snooping" on the transmissions to Smartphone 104. With the passive approach, the monitoring enables the AP 100 to determine the playback rate of the stream and the amount of data already transferred to the client device in order to estimate an amount of data that currently is located in buffer.

It should be noted that this active or passive analysis process may be performed by the AP 100 independently for each of the wireless devices being serviced by AP 100 (e.g. active or passive analysis is performed for Smartphone 104, STB 102 or any other wireless device that is serviced by AP 100 based on the individual channel degradations). For example, the active or passive analysis process may be performed for Smartphone 104 communicating on channel 1 but not for STB 102 communicating on channel 2, when it is determined that channel 1 has degraded below a threshold, but channel 2 has not degraded below a threshold. A similar active or passive analysis process may be performed for STB 102 communicating on channel 2, when it is determined that channel 2 has degraded below a threshold, but the channel that Smartphone 104 is using at that time has not degraded below a threshold.

It should be noted that the active feedback transmitted from Smartphone 104 as well as the passive statistical analysis performed by AP 100 in order to determine the amount of data in the buffer, can be performed continuously, in a periodic manner or based on a trigger event such as the channel falling below a specific degradation value (e.g. QOS).

In either case, AP 100 makes a decision on whether sounding can be performed or not and/or the number of channels to scan during a sounding. If there is sufficient amount of data in the buffer of the client device, then AP 100 stops transmitting the data and then sounds (i.e., scans) other channels in the 802.11 protocol. If there is not a sufficient amount of data in the buffer of the client device, then AP 100 does not perform the scanning, and the AP 100 continues streaming the data to the client device on the current channel.

In an example relating to communications for multiple client devices operating independently on different channels, AP 100 may determine that STB 102 has enough data stored in its buffer in order for the AP 100 to perform sounding on three other 802.11 channels without interruption of the streaming data presentation on the television 106 by the STB 102. However, AP 100 may also determine that Smartphone 104 only has enough data buffered for AP 100 to scan one other possible 802.11 channel. Based on this information, AP 100 stops transmission to STB 102 and performs scanning on the three other 802.11 channels in order to make the determination if a channel switch should occur or not. Likewise, AP 100 performs scanning on one other 802.11 channel on behalf of Smartphone 104 in order to determine if switching channels is appropriate. In general, once the scan is finished, AP 100 may determine that STB 102 and Smartphone 104 would benefit from switching to one of the scanned 802.11 channels. If this decision is made by AP 100, then the switch is made, and streaming of the data is resumed on the new channel. However, if the scanned channels are not determined to be better than the current channel, then AP 100 resumes streaming data over the current channel.

Shown in FIG. 2 is a more detailed block diagram of AP 100 from FIG. 1 and a client device 200 represents STB 102 and/or Smartphone 104 shown in FIG. 1. More specifically, FIG. 2 shows examples of the internal hardware components that are included in client device 200 and AP 100.

For example, AP 100 includes a wireless communication transceiver 210 that is able to communicate using 802.11 protocol. AP 100 includes network interface 212 which may support include an Ethernet connection to modem 108. AP 100 in the example also includes processor circuitry forming a central processing unit (CPU) 214. The circuitry implementing the CPU 214 may be based on any processor or microprocessor architecture such as a Reduced instruction set computing (RISC) using an ARM architecture, as commonly used today in mobile devices and other portable electronic devices, or a microprocessor architecture more commonly used in computers such as an instruction set architecture (ISA) or Complex instruction set computing (CISC) architecture. The CPU 214 may use any other suitable architecture. Any such architecture may use one or more processing cores. The CPU 214 may contain a single processor/microprocessor, or it may contain a number of microprocessors for configuring the AP 100 as a multi-processor system. Other examples of processors that may be included in such a device include math co-processors, image processors, application processors (APs) and one or more baseband processors (BPs). The various included processors may be implemented as separate circuit components or can be integrated in one or more integrated circuits, e.g. on one or more chips. AP 100 in the example also includes memory 216 that stores at least portions of instructions for execution by and data for processing by the CPU.

Likewise, client device 200 also includes a similar wireless communication transceiver 202, one or more processors forming a CPU 206 and memory 208 that stores at least portions of instructions for execution by and data for processing by the CPU 206. In addition, client device 200 may also include hardware serving as a user input/output (I/O) interface 204, which in the case of the Smartphone may include a touchscreen, buttons, speaker, microphone, etc. (not shown). In the case of an STB, the input elements of the I/O 204 might include an infrared receiver to receive commands from the user's remote control and possibly a few buttons on the STB box itself. The output for I/O 204 in the STB example would include video and audio drivers to operate the television 106 as the actual audiovisual output hardware.

During operation, assume for example that a client device 200 receives a request for specific data from the client via user I/O 204, e.g. the user in the example presses a button on the touchscreen of the Smartphone to select a movie to stream to that device. CPU 206, using memory 208 then instructs wireless communication transceiver 202 to transmit a request, via 802.11 protocol, to AP 100. AP 100 then receives this request via wireless communication transceiver 210 which also utilizes the 802.11 protocol. CPU 214 of the AP 100, using memory 216, then instructs the wireless communication transceiver 210 to transmit this request to modem 108 via network interface 212. The request is then forwarded from modem 108 through network 110 to content provider 112.

In response to this request in our example, content provider transmits a stream of data for the requested movie via network 110, modem 108 and network interface 212 to AP 100. CPU 214 then instructs the wireless communication transceiver 210 to transmit the movie data stream to the wireless communication transceiver 202 of client device 200. CPU 206 (or a video processor if separately included) then processes this received movie data and outputs the movie through a display within user I/O 204, thereby allowing the user to view the streamed movie.

It should be noted that client device 200 may transmit the active feedback data to AP 100 via wireless communication transceiver 202. Alternatively, AP 100 may utilize CPU 214 to perform the passive snooping that was previously described.

If AP 100 determines, via the active feedback or the passive snooping, that sounding is possible while mitigating interruption of the output presentation to the user based on the data streaming, then wireless communication transceiver 210 scans the various 802.11 channels that are available and perform a switch so that transmissions occur on a better 802.11 channel.

As described above, the client device (e.g. Smartphone 104) as shown in FIG. 1 may perform active feedback where the time domain status of the buffered data (i.e. buffer status information) which may include data buffer size, data consumption rate and data buffer fullness information among others that are transmitted back to AP 100, thereby allowing AP 100 to make a decision on whether sounding and switching is possible. The details of this algorithm are described in FIGS. 3A and 3B.

Specifically, step 300 in FIG. 3A shows that the client device determines its data buffer size, data consumption rate and data buffer fullness. The CPU within the client device then inserts this data buffer size, data consumption rate and data buffer fullness data into the 802.11 transmission. In particular, this time domain status of buffered data is inserted into a data section of one of the 802.11 control frames that is transmitted from the client device to AP 100. Once the data has been inserted into the data section of the 802.11 control frame, the 802.11 control frame (including the data section) is transmitted to AP 100 as shown in step 304. It should be noted that the client device active feedback is not limited to data buffer size, data consumption rate and data buffer fullness. Active feedback to report the time domain status of the buffered data may include other feedback data. This other feedback data may include, but is not limited to device playback delay, stream bit rate, and steamed device calculated buffer playback time, which may also be inserted into the 802.11 transmission.

Figure 3B:
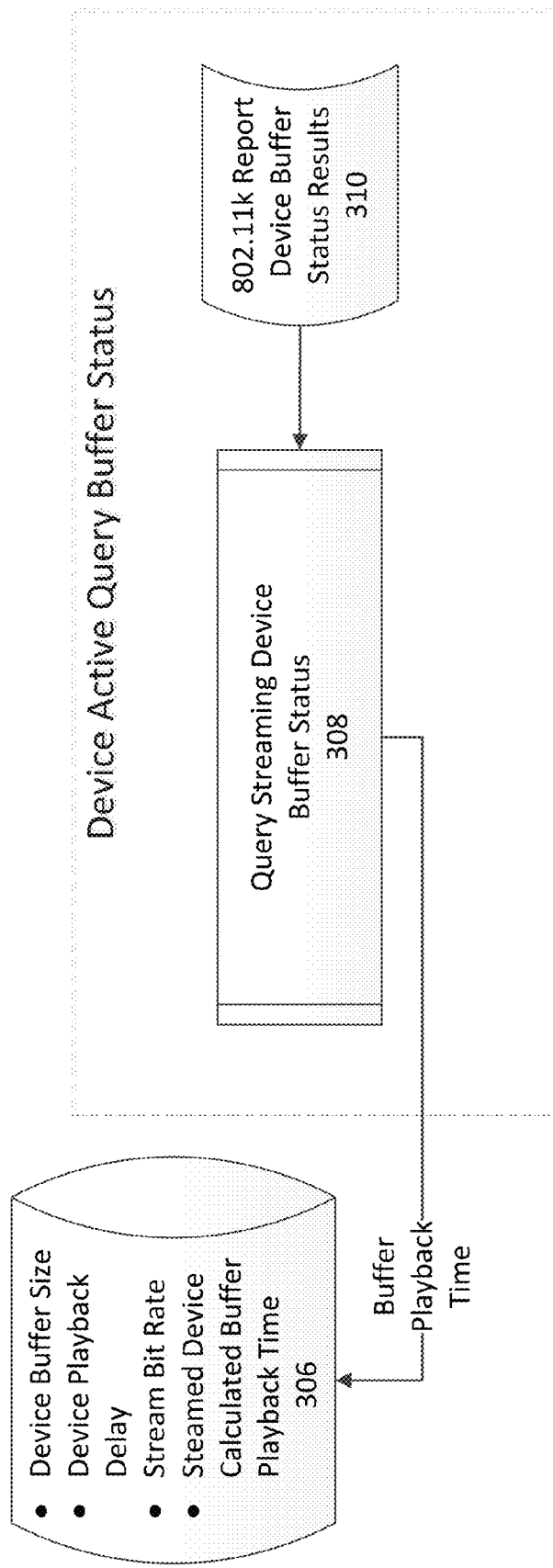
FIG. 3B is another flowchart illustrating an example of active feedback performed by the client device.

In another example, step 310 of FIG. 3B shows that the system receives an 802.11 report of device buffer status results in response to a streaming device buffer status query in step 308. These results, which include data such as device buffer size, device playback delay, stream bit rate, and steamed device calculated buffer playback time, are then stored in step 306.

Figure 4:
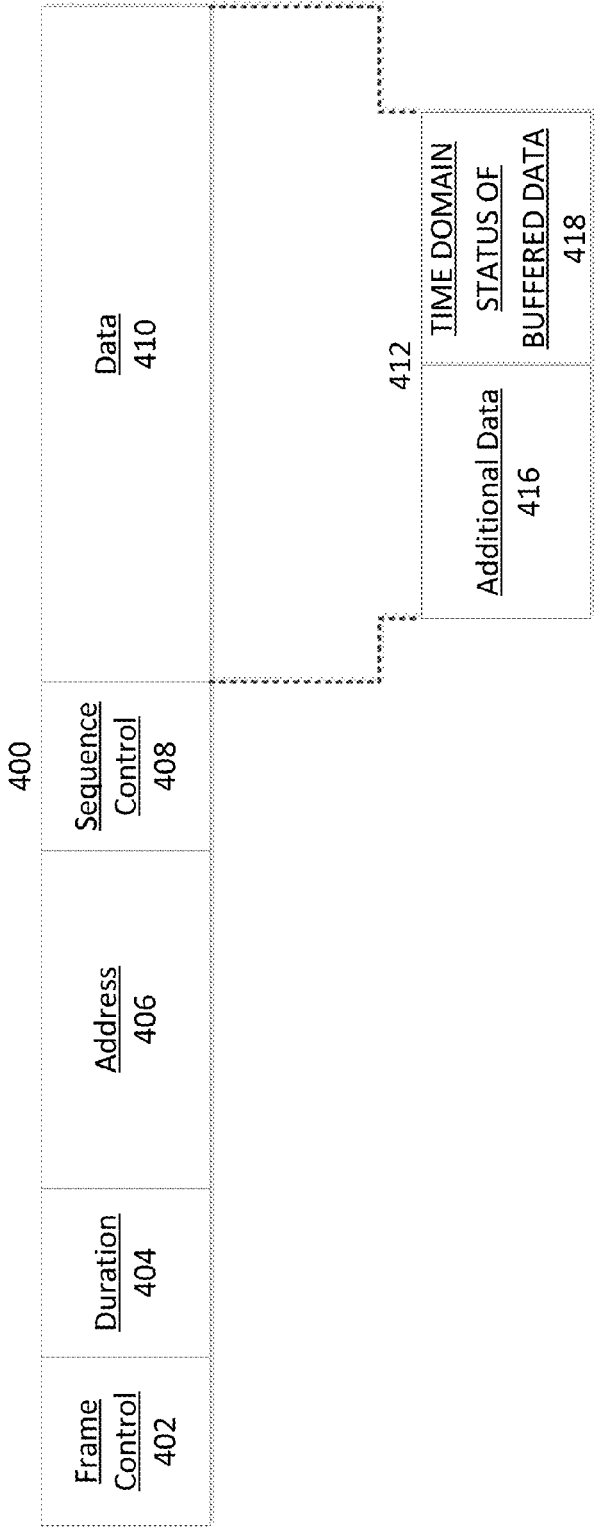
FIG. 4 is a drawing of an 802.11 frame including active feedback information transmitted from the client device.

Shown in FIG. 4 is a detailed diagram of an 802.11 frame 400 (e.g. control frame) which includes multiple sections. These sections include, but are not limited to, a frame control section 402, a duration section 404, an address section 406, a sequence control section 408 and a data section 410. Data section 410 is where the information related to the state of the client device buffer (i.e. time domain status of buffered data), as described in step 302 of FIG. 3A, is inserted. Shown for clarification purposes is a zoomed-in version of the information that is included in the data section 410. This is shown as zoomed-in section 412. Data section 412 includes any additional data 416 and the time domain status of the client buffer data (i.e. buffer status information) that is inserted as section 418.

In general, the 802.11 control frame (including the data section) is transmitted from the client device to AP 100. AP 100 then extracts the buffer status information from the data section 418, and then utilizes this information in order to determine whether sounding can be performed (i.e., whether client device 100 includes a sufficient amount of buffered data so that streaming interruption is mitigated during the sounding process). For example, AP 100 determines that there is sufficient data in the buffer if it is determined that the sounding can be performed in less time that the data currently stored in the buffer will be consumed by the client device.

It should be noted that the transmission of this buffer status information is transmitted from client device 200 to AP 100 for various reasons. Specifically, the transmission of the data may occur periodically, continuously or even discontinuously such as based on a trigger. For example, client device 200 may be monitoring the quality of service (QoS) of the streamed data which may include the error rate of the streamed data. If client device 200 determines that the degradation has fallen below an acceptable level, client device 200 may then send the time domain status of the buffer data (i.e. buffer status information) in data 418 in an attempt to request AP 100 to perform sounding and switching to a better channel.

Figure 5A:
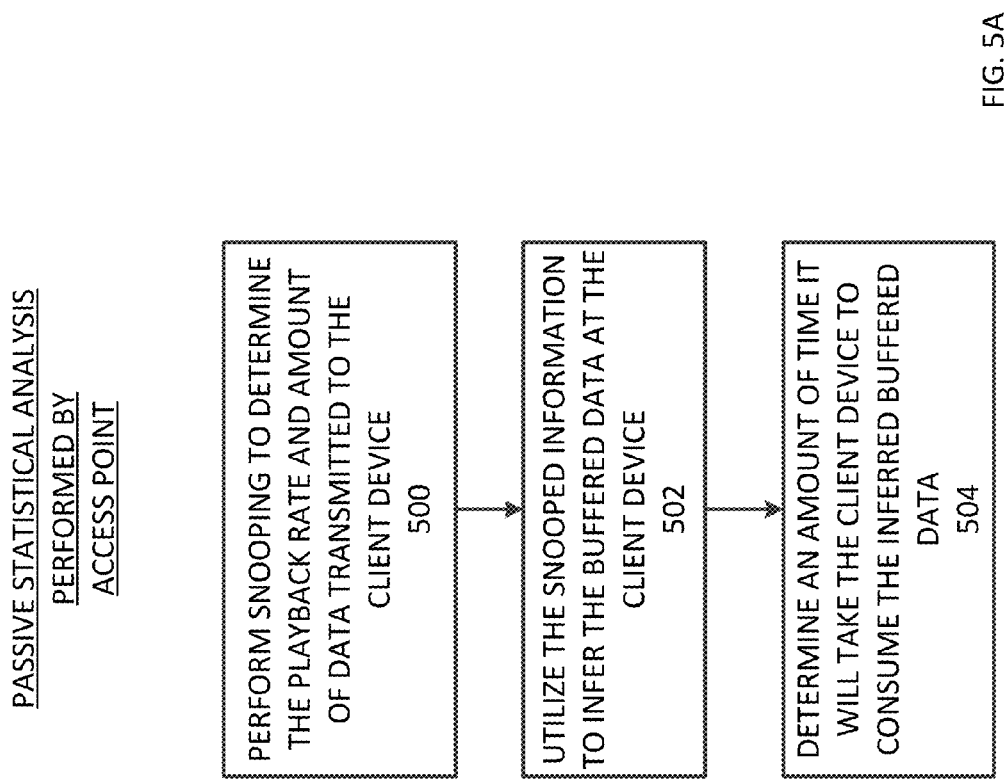
FIG. 5A is a flowchart illustrating an example of passive statistical analysis performed by the access point.

FIGS. 3 and 4 describe the active feedback scenario where client device 200 actually transmits buffer status information back to AP 100. However, active data is not necessary to determine if sounding can be performed while mitigating interruption during streaming. As shown in FIG. 5A, the AP 100 may actually perform a passive statistical analysis. This may be beneficial when it is not possible to receive active feedback from the client device.

As shown in FIG. 5A, the AP 100 performs snooping of the playback rate of the stream via Internet group management protocol (IGMP) or other snooping methods in order to characterize the playback rate. AP 100 also performs snooping of the amount of data already transferred (e.g. average transmission rate over time) to the client device (via active statics gathered from the data stream). Based on this snooping, AP 100 estimates the amount of data currently buffered at the client device and based on the consumption rate, determine how long it will take the client device to exhaust this buffered data while playing back the video. This allows AP 100 to determine whether sounding and switching to other 802.11 channels (and how many channels) is possible so that streaming video interruption is mitigated during playback.

For example, as shown in step 500 of FIG. 5A, AP 100 performs snooping in order to determine a playback rate and the amount of data transmitted to the client device. In step 502, AP 100 utilizes the snooped information to estimate the amount of buffer data currently at the client device. In step 504, AP 100 then determines the amount of time it will take for the client device to consume the estimated buffer data at the data current consumption rate.

If it is possible to scan other 802.11 channels within this amount of time, then AP 100 performs the scan. For example, if AP 100 determines that it will take client device 100 ms to consume the buffer data, then AP 100 performs multiple channel scans in 802.11 which typically only take about 20-50 ms to perform. This allows the sounding to be performed while the client device is playing back (i.e. consuming) the data currently stored in the buffer. Once the sounding is finished, then AP 100 switches the channels and data transmission resumes, thereby refilling (i.e. replenishing) the buffers of client device 200 before they are exhausted.

Figure 5B:
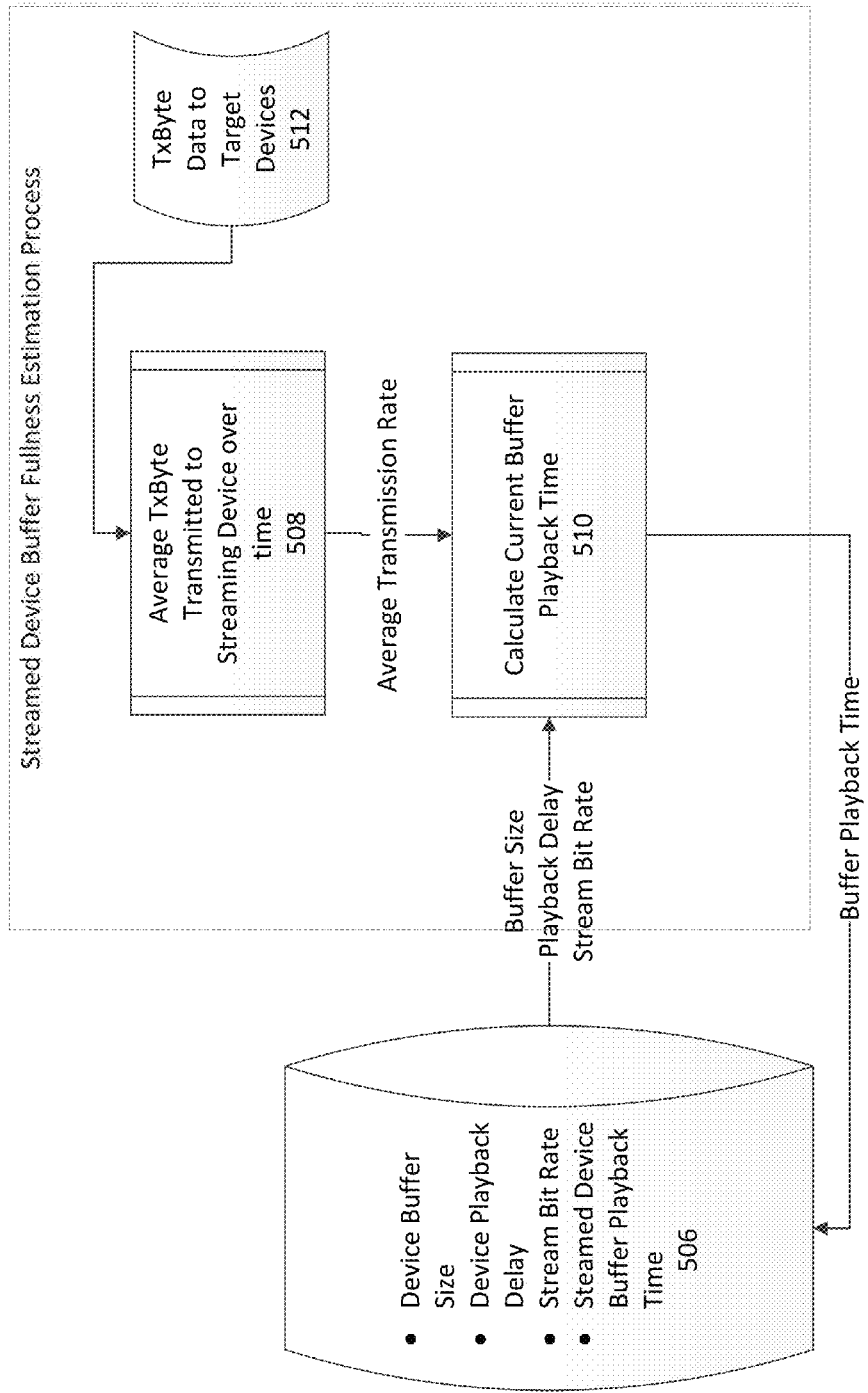
FIG. 5B is another flowchart, illustrating an example of passive statistical analysis performed by the access point.

In another example, as shown in step 512 of FIG. 5B, the TxByte (bytes of transmission) data transmitted to target device is input to step 508, where the average transmission rate is computed. The average current buffer playback time is then computed in step 510 based on the average TxByte transmission rate and the data (device buffer size, device playback delay, stream bit rate, steamed device buffer playback time) stored in step 506.

It should be noted that history information (i.e. previously determined playback rate and data transferred to a client device) may be stored and managed by AP 100. This history information may be used during the passive statistical analysis to make a more accurate estimate of how long it will take the client device to exhaust this buffered data while playing back the video. For example, if history information indicates that the client device consumes less data at a specific time of the day (e.g. afternoon), then this may indicate that the time for the client device to exhaust the buffered data may be longer than currently estimated. In general, time of day and other factors may be used to store this history information for later analysis.

In either the active feedback scenario or the passive statistical analysis scenario, AP 100 makes a determination as to whether sounding and switching between channels can be performed without impacting client video playback. This is performed by a distributed content control (DCC) algorithm that is being executed by CPU 214 of AP 100.

Specifically, the DCC algorithm utilizes the active feedback information (e.g. data buffer size, data consumption rate, data buffer fullness, device playback delay, stream bit rate, and steamed device calculated buffer playback time, etc.) or the passive statistical analysis (e.g. average transmission rate over time) along with other collected data to determine if channel sounding and switching can be made while mitigating interruption of video streaming on the client video device (i.e., interrupting the streaming of the video). A detailed explanation of this process is shown in the flowchart of FIG. 6A.

Specifically, as shown in step 600, AP 100 performs the DCC based on the data determined during the active feedback or the passive statistical analysis. In steps 602 and 604, the DCC determines if channel sounding and a channel switch can be performed without perceivably impacting client device playback. If both the sounding and switching can be performed without perceivably impacting client device playback, then sounding, and potentially switching is performed.

Figure 6B:
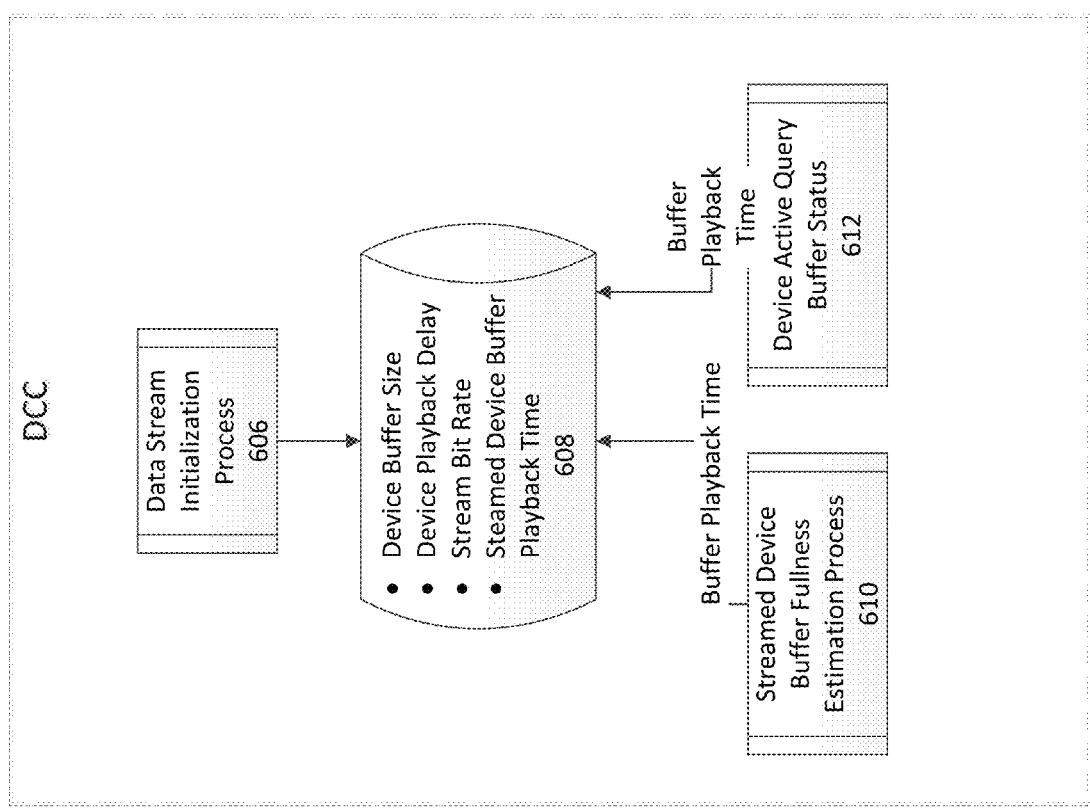
FIG. 6B is another flowchart illustrating distributed content control using information obtained during the active feedback in FIGS. 3A and 3B or using information obtained during the passive statistical analysis in FIGS. 5A and 5B.

This overall DCC process is also shown in FIG. 6B, where the data stream is initialized in step 606, and the data stored in step 608 may be used by either the active feedback method in step 612 or the passive analysis in step 610 to determine the buffer playback time. This buffer playback time is then used by the DCC to determine when sounding/switching is allowed.

Figure 6C:
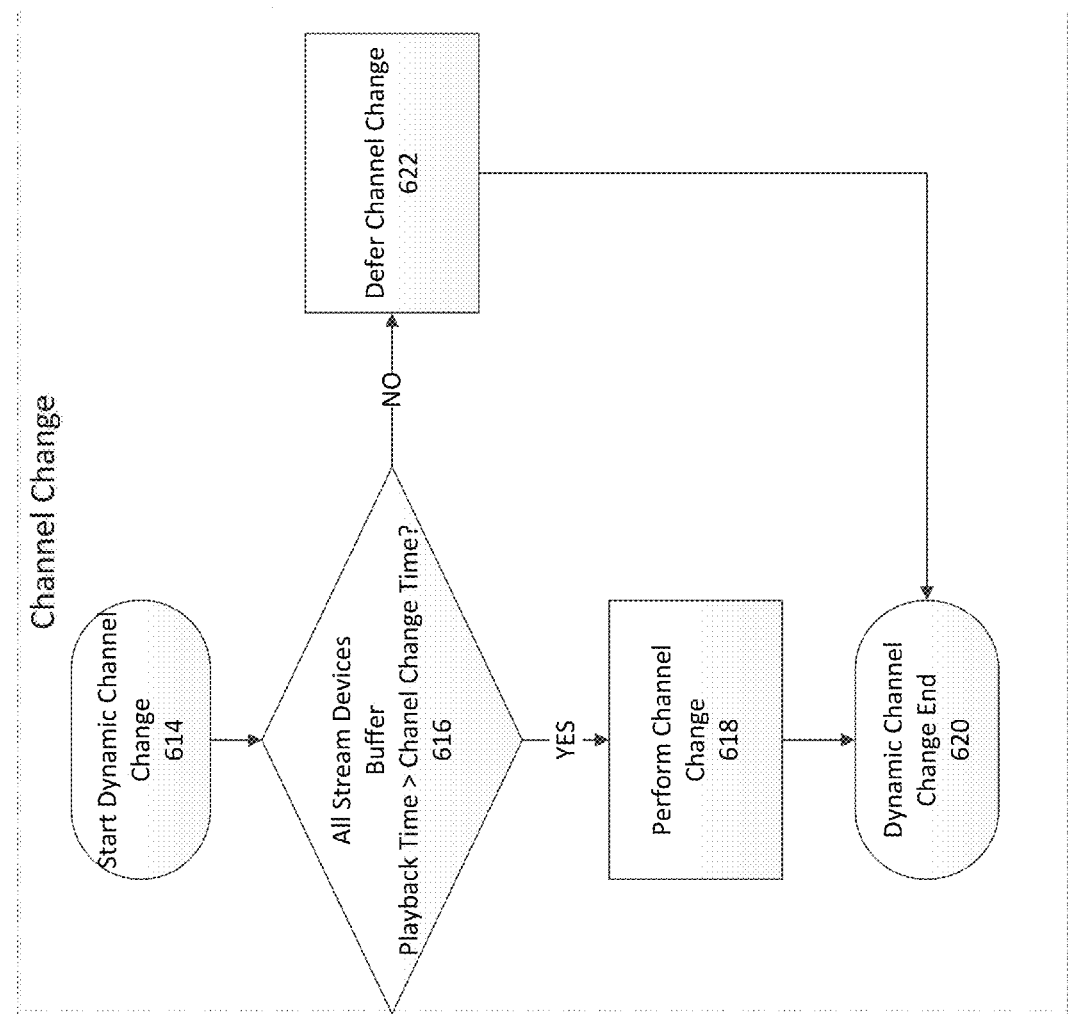
FIG. 6C is a flowchart illustrating the channel change algorithm that could be used with active feedback or passive analysis.

An example of the process for determining when to switch is shown in the flowchart of FIG. 6C. Specifically, in step 614, the dynamic channel change algorithm is started. In step 616 it is determined if the buffer playback time is greater than the channel change time. If the buffer playback time is greater than the channel change time, then channel change is performed in step 618 and the process ends in step 620. However, if the buffer playback time is not greater than the channel change time, then in step 622 the channel change is deferred to a later point in time.

It should be noted that 802.11 protocol includes multiple channels that can be utilized by communication devices for transmission between AP 100 and client device 200. It may not be possible to scan every possible channel on behalf of client device 200 in one scanning session. However, AP 100 is able to determine a number of channels (e.g., 1 channel, 2 channels, 10 channels) that can be scanned in one scanning session on behalf of the client device without perceivably impacting the client device playback.

For example, if it is determined via the active feedback or the passive statistical analysis that the client device 200 includes enough buffer data to scan 10 channels, then it is possible for AP 100 to perform a scan of all 10 channels. This does not require AP 100 to scan all 10 channels. AP 100 can scan 1 channel, 2 channels, or any number of channels (e.g. all 10 channels) in an attempt to determine a new channel that it is better than the current channel being utilized for transmission to the client device. When this new channel is found, AP 100 performs a channel switch and resumes data transmission (i.e. streaming) on the new channel.

It should also be noted that AP 100 may switch back and forth between transmitting data and scanning channels over a longer period of time to find a new channel for switching. For example, if the client device has a small buffer or a large data consumption rate, AP 100 may only be able to scan 1 new channel during the sounding process before having to switch back to transmitting data to avoid streaming interruption (e.g. there is not enough buffered data to scan all channels in one sounding process). In this scenario, AP 100 may switch back and forth between scanning and sounding over a longer period time to scan multiple channels one at a time in order to find a new channel to switch to.

In any case, the system is able to perform a dynamic channel change in 802.11 (e.g. 802.11k) for APs and specifically in a 5 GHz band by taking into account the amount of buffered data in the client device. By taking into account the amount of buffered data in the client device, AP 100 is able to make an intelligent decision on whether sounding and/or switching of 802.11 channels is possible without negatively effecting the playback of the streaming data.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Although the system is illustrated and described herein with reference to specific examples, it is not intended to be limited to the details shown. Rather, various modifications may be made in the details within the scope and range of equivalents of the claims.

What is claimed:

1. A wireless access point device, comprising:
  a network interface configured to communicate with a content provider server through a network;
  a wireless transceiver configured to communicate with a client device through an antenna; and
  a processor coupled to and configured to control the network interface and the wireless transceiver, to cause the wireless access point device to:
    receive data from the content provider server through the network interface,
    stream the data to the client device through the wireless transceiver over a first channel of a plurality of channels,
    determine that a buffer of the client device has sufficient buffered data having been received over the first channel so that output of streamed data via the client device can continue during a channel scan, and
    scan a second channel of the plurality of channels, whereby the output of the streamed data via the client device continues during the scan of the second channel,
  wherein the processor is further configured to cause the wireless access point device to:
  during data streaming over the first channel, monitor the streaming of the data to the client device through the wireless transceiver to determine a data playback rate of the client device and an amount of data transmitted to the client device;
  during data streaming over the first channel, determine to scan the second channel, based on the playback rate and the amount of data indicating that the buffer of the client device has sufficient buffered data; and
  select the second of the plurality of channels as a different channel for further streaming of the data to the client device through the wireless transceiver.

2. The wireless access point device of claim 1, wherein the processor is further configured to cause the wireless access point device to:
  receive buffer status information in a control frame of data frames transmitted from the client device, the buffer status information including at least one of buffer size, data consumption rate, or buffer fullness for determining that the buffer of the client device has sufficient buffered data; and
  determine that the client device has sufficient buffered data by estimating, based on the buffer status information received from the client device, that the scan can be performed in less time than the data in the buffer will be consumed by the client device.

3. The wireless access point device of claim 1, wherein the processor is further configured to cause the wireless access point device to:
determine a number of channels to scan based on buffer status information received from the client device, from among the plurality of channels; and
switch back and forth between scanning channels of the plurality of channels and streaming data through the wireless transceiver over the first channel based on buffer status information received from the client device, until the selection of the second channel for further streaming of the data to the client device.

4. The wireless access point device of claim 1, wherein the processor is further configured to cause the wireless access point device to maintain history information pertaining to buffer status information received from the client device.

5. A wireless access point device, comprising:
a network interface configured to communicate with a content provider server through a network;
a wireless transceiver configured to communicate with a client device through an antenna; and
a processor coupled to and configured to control the network interface and the wireless transceiver, to cause the wireless access point device to:
receive data from the content provider server through the network interface,
stream the data to the client device through the wireless transceiver over a first channel of a plurality of channels,
determine that a buffer of the client device has sufficient buffered data having been received over the first channel so that output of streamed data via the client device can continue during a channel scan, and
scan a second channel of the plurality of channels, whereby the output of the streamed data via the client device continues during the scan of the second channel, wherein the processor is further configured to cause the wireless access point device to:
select between performing active feedback or passive analysis of the buffer of the client device;
when the active feedback is selected:
1) receive, from the client device through the wireless transceiver, buffer status information,
2) during data streaming over the first channel, determine to scan the second channel,
3) determine that the received buffer status information indicates that the buffer of the client device has sufficient buffered data having been received over the first channel so that output of streamed data via the client device can continue during the channel scan, and
4) scan the second channel via the wireless transceiver in response to the determinations, to select the second of the plurality of channels as the different channel for further streaming of the data to the client device through the wireless transceiver; and
when the passive feedback is selected:
a) during data streaming over the first channel, monitor the streaming of the data to the client device through the wireless transceiver to determine a data playback rate of the client device and an amount of data transmitted to the client device,
b) during data streaming over the first channel, determine to scan the second channel,
c) determine, based on the playback rate and the amount of data transmitted to the client device, that the buffer of the client device has sufficient buffered data having been received over the first channel so that output of streamed data via the client device can continue during the channel scan, and
d) in response to the determinations to scan and that the buffer of the client device has sufficient buffered data, scan the second channel via the wireless transceiver to select the second channel as the different channel for further streaming of the data to the client device through the wireless transceiver.

6. A method, comprising:
communicating, by a network interface of a wireless access point, with a content provider server through a network;
communicating, by a wireless transceiver of the wireless access point, with a client device through an antenna;
receiving, by a processor of the wireless access point coupled to both the wireless transceiver and the network interface, data from the content provider server through the network interface;
streaming, by the processor, the data to the client device over a first channel of a plurality of channels;
determining, by the processor, that a buffer of the client device has sufficient buffered data having been received over the first channel so that output of streamed data via the client device can continue during a channel scan; and
scanning, by the processor, the second channel of the plurality of channels, whereby the output of the streamed data via the client device continues during the scan of the second channel,
further comprising:
during data streaming over the first channel, monitoring, by the processor, the streaming of the data to the client device through the wireless transceiver to determine a data playback rate of the client device and an amount of data transmitted to the client device;
during data streaming over the first channel, determining, by the processor, to scan the second channel, based on the playback rate and the amount of data indicating that the buffer of the client device has sufficient buffered data; and
selecting, by the processor, the second of the plurality of channels as a different channel for further streaming of the data to the client device through the wireless transceiver.

7. A method, comprising:
communicating, by a network interface of a wireless access point, with a content provider server through a network;
communicating, by a wireless transceiver of the wireless access point, with a client device through an antenna;
receiving, by a processor of the wireless access point coupled to both the wireless transceiver and the network interface, data from the content provider server through the network interface;
streaming, by the processor, the data to the client device over a first channel of a plurality of channels;
determining, by the processor, that a buffer of the client device has sufficient buffered data having been received over the first channel so that output of streamed data via the client device can continue during a channel scan; and scanning, by the processor, the second channel of the plurality of channels, whereby the output of the streamed data via the client device continues during the scan of the second channel, further comprising:

determining, by the processor, a playback rate and an amount of data transmitted to the client device by snooping on the client device; and determining, by the processor, that the client device has sufficient buffered data by estimating, based on the playback rate and the amount of data transmitted to the client device, such that the scan can be performed in less time than the data in the buffer will be consumed by the client device.

8. The method of claim 6, further comprising:

maintaining, by the processor, history information pertaining to buffer status information of the client device; and implementing, by the processor, a distributed content control algorithm to control the streamed data to the client device.

9. The method of claim 6, further comprising:

determining, by the processor, a number of channels to scan based on buffer status information of the client device; and switching back and forth, by the processor, between scanning channels and streaming data based on the buffer status information received from the client device.

10. A method, comprising:

communicating, by a network interface of a wireless access point, with a content provider server through a network;

communicating, by a wireless transceiver of the wireless access point, with a client device through an antenna;

receiving, by a processor of the wireless access point coupled to both the wireless transceiver and the network interface, data from the content provider server through the network interface;

streaming, by the processor, the data to the client device over a first channel of a plurality of channels;

determining, by the processor, that a buffer of the client device has sufficient buffered data having been received over the first channel so that output of streamed data via the client device can continue during a channel scan; and scanning, by the processor, the second channel of the plurality of channels, whereby the output of the streamed data via the client device continues during the scan of the second channel, further comprising:

selecting, by the processor, between performing active feedback or passive analysis of the buffer of the client device;

when the active feedback is selected:
1) receiving, from the client device through the wireless transceiver, buffer status information,
2) during data streaming over the first channel, determining to scan the second channel,
3) determining that the received buffer status information indicates that the buffer of the client device has sufficient buffered data having been received over the first channel so that output of streamed data via the client device can continue during the channel scan, and
4) scanning the second channel via the wireless transceiver in response to the determinations, to select the second of the plurality of channels as the different channel for further streaming of the data to the client device through the wireless transceiver; and when the passive feedback is selected:
a) during data streaming over the first channel, monitoring the streaming of the data to the client device through the wireless transceiver to determine a data playback rate of the client device and an amount of data transmitted to the client device,
b) during data streaming over the first channel, determining to scan the second channel,
c) determining, based on the playback rate and the amount of data transmitted to the client device, that the buffer of the client device has sufficient buffered data having been received over the first channel so that output of streamed data via the client device can continue during the channel scan, and
d) in response to the determinations to scan and that the buffer of the client device has sufficient buffered data, scanning the second channel via the wireless transceiver to select the second channel as the different channel for further streaming of the data to the client device through the wireless transceiver.

11. A non-transitory computer readable medium including programming stored thereon, that when executed by a processor of a wireless access point, causes the wireless access point to:

communicate with a content provider server through a network interface;

communicate with a client device through an antenna;

receive data from the content provider server through the network interface, stream the data to the client device through a wireless transceiver over a first channel of a plurality of channels, determine that a buffer of the client device has sufficient buffered data having been received over the first channel so that output of streamed data via the client device can continue during a channel scan, and scan a second channel of the plurality of channels, whereby the output of the streamed data via the client device continues during the scan of the second channel, further causing the wireless access point to:

during data streaming over the first channel, monitor the streaming of the data to the client device through the wireless transceiver to determine a data playback rate of the client device and an amount of data transmitted to the client device;

during data streaming over the first channel, determine to scan the second channel, based on the playback rate and the amount of data indicating that the buffer of the client device has sufficient buffered data; and select the second of the plurality of channels as a different channel for further streaming of the data to the client device through the wireless transceiver.

12. A non-transitory computer readable medium including programming stored thereon, that when executed by a processor of a wireless access point, causes the wireless access point to:

communicate with a content provider server through a network interface;

communicate with a client device through an antenna;

receive data from the content provider server through the network interface, stream the data to the client device through a wireless transceiver over a first channel of a plurality of channels, determine that a buffer of the client device has sufficient buffered data having been received over the first channel so that output of streamed data via the client device can continue during a channel scan, and scan a second channel of the plurality of channels, whereby the output of the streamed data via the client device continues during the scan of the second channel, further causing the wireless access point to:

select between performing active feedback or passive analysis of the buffer of the client device;

when the active feedback is selected:
1) receive, from the client device through the wireless transceiver, buffer status information,
2) during data streaming over the first channel, determine to scan the second channel,
3) determine that the received buffer status information indicates that the buffer of the client device has sufficient buffered data having been received over the first channel so that output of streamed data via the client device can continue during the channel scan, and
4) scan the second channel via the wireless transceiver in response to the determinations, to select the second of the plurality of channels as the different channel for further streaming of the data to the client device through the wireless transceiver; and when the passive feedback is selected:
a) during data streaming over the first channel, monitor the streaming of the data to the client device through the wireless transceiver to determine a data playback rate of the client device and an amount of data transmitted to the client device,
b) during data streaming over the first channel, determine to scan the second channel,
c) determine, based on the playback rate and the amount of data transmitted to the client device, that the buffer of the client device has sufficient buffered data having been received over the first channel so that output of streamed data via the client device can continue during the channel scan, and
d) in response to the determinations to scan and that the buffer of the client device has sufficient buffered data, scan the second channel via the wireless transceiver to select the second channel as the different channel for further streaming of the data to the client device through the wireless transceiver.

13. A non-transitory computer readable medium including programming stored thereon, that when executed by a processor of a wireless access point, causes the wireless access point to:

communicate with a content provider server through a network interface;

communicate with a client device through an antenna;

receive data from the content provider server through the network interface, stream the data to the client device through a wireless transceiver over a first channel of a plurality of channels, determine that a buffer of the client device has sufficient buffered data having been received over the first channel so that output of streamed data via the client device can continue during a channel scan, and scan a second channel of the plurality of channels, whereby the output of the streamed data via the client device continues during the scan of the second channel, further causing the wireless access point to:

determine a playback rate and an amount of data transmitted to the client device by snooping on the client device, the playback rate and the amount of data transmitted are used to determine that the client device has sufficient buffered data such that the scan can be performed in less time than the data in the buffer will be consumed by the client device.

* * * * *